(12) United States Patent
Miller et al.

(10) Patent No.: US 9,319,350 B2
(45) Date of Patent: Apr. 19, 2016

(54) VIRTUAL ADDRESS FOR VIRTUAL PORT

(75) Inventors: Paul Miller, Houston, TX (US); Aaron L Jenkins, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 980 days.

(21) Appl. No.: 13/091,444

(22) Filed: Apr. 21, 2011

(65) Prior Publication Data

US 2012/0271925 A1  Oct. 25, 2012

(51) Int. Cl.
*G06F 15/16* (2006.01)
*H04L 12/931* (2013.01)

(52) U.S. Cl.
CPC ...................... *H04L 49/35* (2013.01)

(58) Field of Classification Search
CPC ............... H04L 41/12; H04L 45/02
See application file for complete search history.

(56) References Cited

U.S. PATENT DOCUMENTS

| | | | |
|---|---|---|---|
| 7,266,706 B2 * | 9/2007 | Brown et al. ................. 714/6.32 |
| 7,353,302 B2 | 4/2008 | Seto | |
| 7,668,925 B1 * | 2/2010 | Liao et al. ...................... 709/212 |
| 7,769,842 B2 | 8/2010 | Weber | |
| 8,024,773 B2 * | 9/2011 | Butler et al. ....................... 726/1 |
| 2004/0088417 A1 * | 5/2004 | Bober .................. H04L 69/329 709/227 |
| 2004/0186898 A1 * | 9/2004 | Kimura et al. ................ 709/213 |
| 2005/0138439 A1 * | 6/2005 | Rothman et al. .............. 713/300 |
| 2006/0075191 A1 * | 4/2006 | Lolayekar ............. G06F 3/0613 711/114 |
| 2007/0220204 A1 * | 9/2007 | Nakajima et al. ............. 711/114 |
| 2008/0092214 A1 * | 4/2008 | Zavalkovsky ........... H04L 63/08 726/4 |
| 2009/0083434 A1 * | 3/2009 | Wang et al. .................... 709/231 |
| 2009/0083484 A1 * | 3/2009 | Basham ............... G06F 3/0605 711/114 |
| 2009/0150643 A1 * | 6/2009 | Jones et al. .................... 711/203 |
| 2009/0222733 A1 | 9/2009 | Basham et al. | |
| 2009/0327578 A1 * | 12/2009 | Cagno ................. G06F 12/0246 711/103 |
| 2011/0078334 A1 * | 3/2011 | Arakawa ............... G06F 3/0607 710/3 |
| 2011/0276728 A1 * | 11/2011 | Otani ...................... G06F 3/062 710/37 |
| 2011/0278334 A1 * | 11/2011 | Aadahl ................... B60R 7/043 224/275 |
| 2012/0102279 A1 * | 4/2012 | Coronado ........... G06F 11/1456 711/162 |

OTHER PUBLICATIONS

Chalupa et al ("Serial Attached SCSI (SAS) Interface Manual" published May 2006).*

* cited by examiner

*Primary Examiner* — Andrew Lai
*Assistant Examiner* — Zhiren Qin
(74) *Attorney, Agent, or Firm* — Hewlett Packard Enterprise Patent Department (57) ABSTRACT

A device to detect storage devices coupled to the device in response to receiving a query from a switch, include the storage devices in logical units, create virtual ports for the logical units, assign virtual addresses for the virtual ports, and send a response with the virtual addresses to switch.

18 Claims, 7 Drawing Sheets

VIRTUAL ADDRESS FOR VIRTUAL PORT

BACKGROUND

A SAS (serial attached SCSI—small computer system interface) protocol network can include multiple storage clients and array systems coupled to one another through one or more SAS switches. A SAS switch can access physical ports on the array systems. By accessing the physical port, the SAS switch can interface with a PHY (physical) port and discover a logical unit associated with the physical port.

Through the PHY ports, the array systems identify themselves to be expander devices capable of zoning. The SAS switch can additionally identify addresses for each of the PHY ports. Each physical port can include a single address utilized by the switch and other devices on the SAS network to identify a location of the PHY port and a logical unit associated with the PHY port.

The SAS switch can include the addresses of the PHY ports in an address table and proceed to manage access to the PHY ports of the logical units through a process called logical unit masking. Logical unit masking is a process where the SAS switch masks or hides an address of a PHY port associated with a logical unit in the address table. The SAS switch shares the address table, including the masked addresses, with storage clients coupled to the SAS switch and the storage clients use the address table to identify addresses of PHY ports which are available to the corresponding storage client to access.

To support logical unit masking, the array systems included in the SAS network fabric employ a common network protocol which utilizes the PHY ports. This can lead to costly overhead for the SAS switch, the storage clients and the expander devices. Additionally, maintenance for the network can be increased due to the large infrastructure and increased points of failures which may be present from relying on multiple PHY ports on multiple devices on the SAS network.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By detecting a query from a switch, the device can respond by detecting storage devices coupled to the device and assign the storage devices to logical units of the device. As a result, the logical units can efficiently be created and allocated on demand. Additionally, by creating virtual ports for the logical units and assigning virtual addresses to the virtual ports, the switch can be notified that the device is an expander device capable of zoning. As a result, the switch can proceed to discover the logical units as physical devices through their corresponding virtual address and virtual port. By creating virtual ports and virtual addresses for the logical units, an amount of infrastructure can be reduced by not requiring physical ports. Additionally, an amount of maintenance for the network can be reduced by using virtual as opposed to physical ports.

Figure 1:
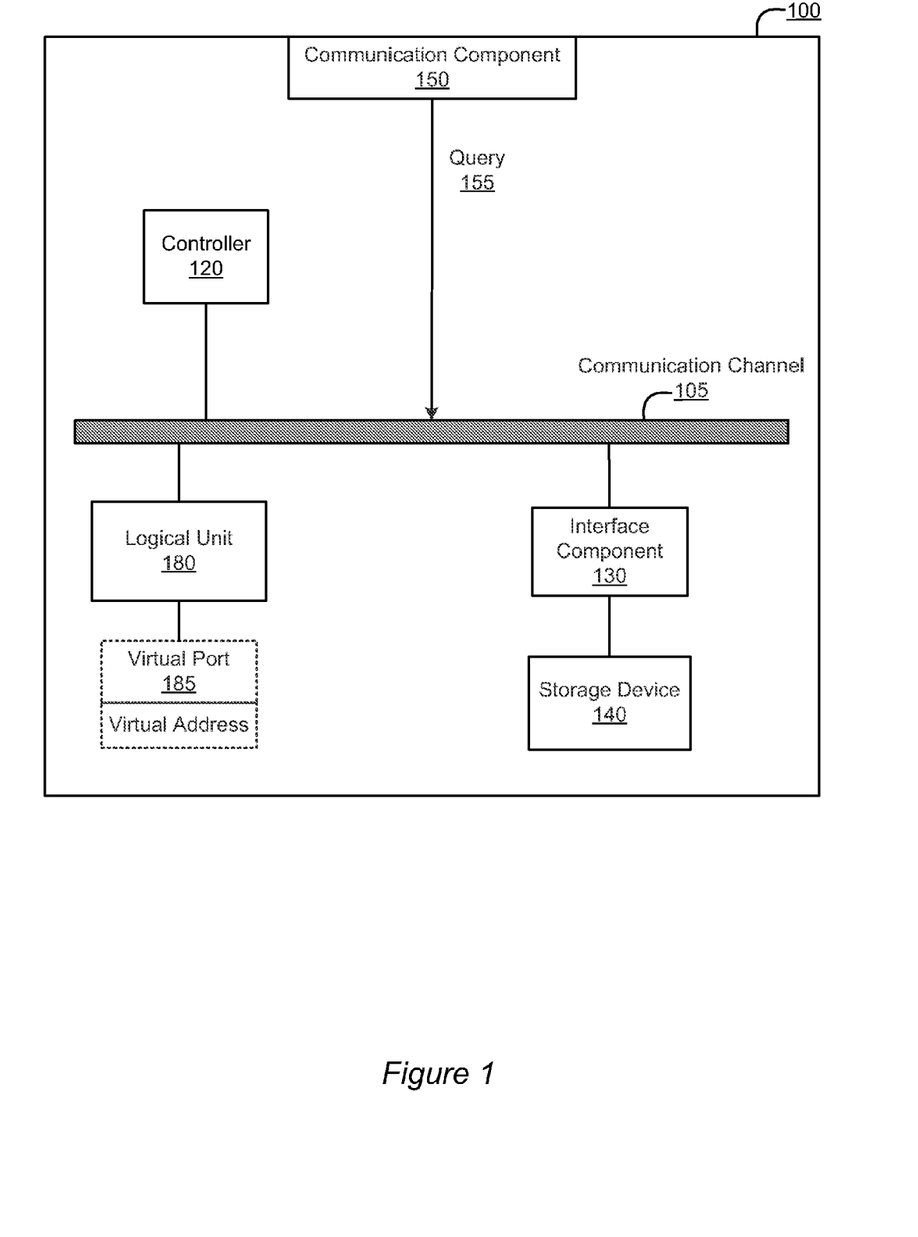
FIG. 1 illustrates a device according to an embodiment.

FIG. 1 illustrates a device 100 according to an embodiment. In one embodiment, the device 100 is a disk storage system, such as an array system. The array system can be a NAS (network attached storage) device or a SAN (storage area network) device. In another embodiment, the device 100 is a server, a desktop, a laptop, a notebook, a tablet, a netbook, an all-in-one system, and/or any additional device which can be coupled to one or more storage devices 140.

The device 100 includes a controller 120, an interface component 130, a communication component 150, at least one storage device 140, at least one logical unit 180, and a communication channel 105 for the device 100 and/or one or more components of the device 100 to communicate with one another. In one embodiment, the device 100 can include an array application stored on a computer readable memory coupled to the device 100. In other embodiments, the device 100 includes additional components in addition to and/or in lieu of those noted above and illustrated in FIG. 1.

As noted above, the device 100 includes a controller 120. The controller 120 can send data and/or instructions to the interface component 130, the communication component 150, the array application, a logical unit 180, and/or any storage device 140 coupled to the device 100. The controller 120 can also receive data and/or instructions from the interface component 130, the communication component 150, the array application, the logical unit 180, and/or any storage device 140 coupled to the device 100.

The array application is an application which can be utilized in conjunction with the controller 120 to manage the device 100 and communication between the device 100 and a switch coupled to the device 100. The array application can be software executable from a tangible, non-transitory computer readable memory of the device 100. In another embodiment, the array application is firmware that is embedded into one or more components of the device 100 as ROM. In other embodiments, the array application is an application which is stored and accessed from a hard drive, a compact disc, a flash disk, a network drive or any other form of computer readable medium that is coupled to the device 100. The array application can communicate with components coupled to the device 100 physically or wirelessly through a communication bus 105 included in or attached to the device 100. The communication bus 105 can be a memory bus and/or a data bus.

When managing the device 100, a communication component 150 of the device 100 can initially detect a query 155 from the switch. The communication component 150 is a hardware component configured to interface the device 100 with the switch and receive and/or send data between the device 100 with the switch. The switch is a network device configured to couple the device 100 to one or more storage clients and/or servers in a network. In one embodiment, the switch can be a serial attached SCSI (small computer system interface) switch. The query 155 can be a request for the device 100 to provide information to the switch. For example, the query 155 can instruct the controller 120 and/or the array application to provide a number of logical units 180 coupled to the device 100 and an address for each of the logical units 180.

In response to detecting the query, the array application and/or the controller 120 application can proceed to detect one or more storage devices 140 coupled to the device 100. When detecting storage devices 140, the array application and/or the controller 120 can determine whether any storage devices 140 are coupled to an interface component 130 of the device 100. The interface component 130 can be a hardware component configured to couple and interface a storage device 140 with the controller 120 and/or the array application. One or more storage devices 140 can be an internal storage device, an external storage device, and/or a remote storage device coupled to the interface component 130.

In response to detecting storage devices 140, the array application and/or the controller 120 can assign the storage devices 140 to one or more logical units 180. For the purposes of this application, a logical unit 180 can be a physical or virtual device with a predefined volume. Storage of one or more of the storage devices 140 can be allocated by the controller 120 and/or the array application to create the volume of a logical unit 180. Once the storage devices 140 have been included or assigned to the logical units 180, the array application and/or the controller 120 can proceed to create virtual ports 185 for each of the logical units 180.

For the purposes of this application, a virtual port 185 can be a non-physical socket which can mimic the functionality of a PHY (physical) port. The virtual port 185 can be created and assigned to a corresponding logical unit 180. The controller 120 and/or the array application can additionally create and assign a virtual address to the virtual port 185. The virtual address can be an artificial address used by the switch and any server connected to the switch to locate and access the virtual port 185 of a corresponding logical unit 180. The controller 120 and/or the array application can create virtual ports 185 and assign virtual addresses for each of the logical units 180 of the device 100.

Once the virtual ports 180 and the virtual addresses have been assigned for each of the logical units 180, the array application and/or the controller 120 can proceed to send the switch a response listing each of the virtual addresses corresponding to the virtual ports 185 of the logical units 180. The controller 120 and/or the array application can additionally manage communication between the logical units 180 and the switch and/or other devices coupled to the switch through the virtual ports 185 if any request for information and/or data is received.

Figure 2:
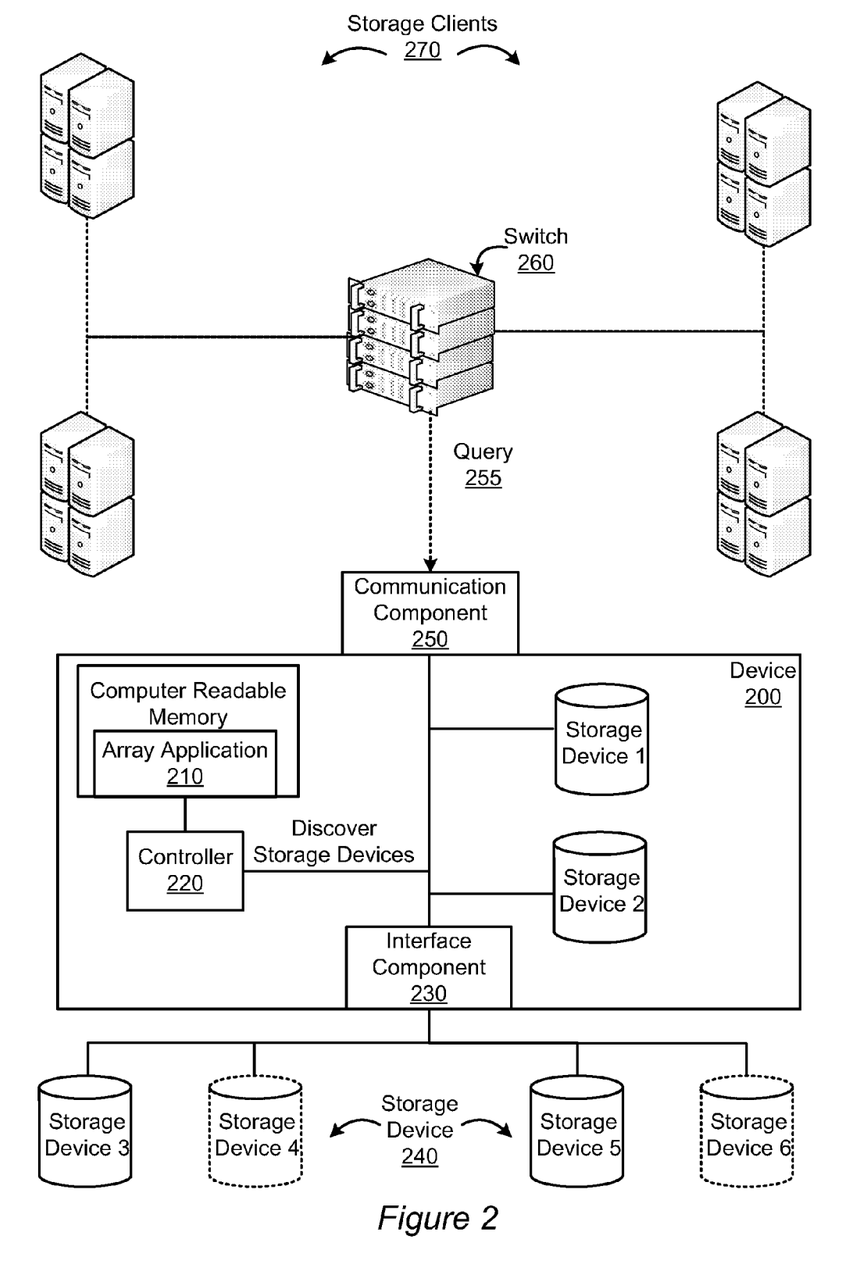
FIG. 2 illustrates a device coupled to a switch according to an embodiment.

FIG. 2 illustrates a device 200 coupled to a switch 260 according to an embodiment. As noted above, the switch 260 is a network device, such as a SAS (serial attached SCSI) switch, which couples the device 200 to one or more endpoints. As shown in FIG. 2, an endpoint can be a storage client 270 and/or server coupled to the switch 260. For the purposes of this application, a storage client 270 is a device which can access one or more logical units accessible to the switch 260. In one embodiment, the storage client 270 can be an initiator and/or a target within the network.

Additionally, as shown in FIG. 2, the switch 260 can transmit a query 255 to a communication component 250 of the device 200. The query 255 can be a request, sent by the switch 260, as a file, a message, and/or any additional form of data which the communication component 250 can receive. In one embodiment, the query 255 can be request for the device 200 to identify addresses of any ports couples to a logical unit of the device 200.

The communication component 250 is a hardware component configured to interface the device 200 with the switch 260 and send and/or receive data between the device 200 and the switch 260. In one embodiment, the communication component 250 can be a SAS port and/or a network interface component. In another embodiment, the communication component 250 can be a Bluetooth component, a radio component, an infra-red component, and/or any additional hardware configured to send and/or receive data between the device 200 and the switch 260.

In response to receiving the query 255, the array application 210 and/or the controller 220 can proceed to detect one or more storage devices 240 coupled to the device 200. A storage device 240 can be any device or component which can read, write, and/or store data. In one embodiment, a storage device 240 can be non-volatile memory, such as a hard disc drive, magnetic media, optical media, and/or flash memory. As shown in FIG. 2, one or more storage device 240 can be local storage devices 240 which are internally or externally coupled to an interface component 230 of the device 200.

In one embodiment, the interface component 230 can be a SCSI (small computer system interface) port, a SATA (serial advanced technology attachment) port, an external SATA port, a PCI (peripheral component interconnect) port, a PCI express port, an IDE (integrated drive electronics) port, a USB (universal serial bus) port, a SD (serial device) port, a compact flash port, and/or a XD (extreme digital) port. In another embodiment, the interface component 230 can be a network interface and one or more storage devices 240 can be remotely coupled to device 200 through the interface component 230. In other embodiments, the interface component 230 can be any additional port or component which can interface with an internal, external, or remote storage device 240.

As shown in FIG. 2, the array application 210 and/or the array controller 220 have detected the interface component 230 to be coupled to 6 storage devices. Storage device 1 and storage device 2 are detected to be internally coupled to the device 200. Additionally, storage device 3 and storage device 5 have been detected to be externally coupled to the device 200. Further, storage device 4 and storage device 6 have been detected to be remotely coupled to the device 200.

Figure 3A:
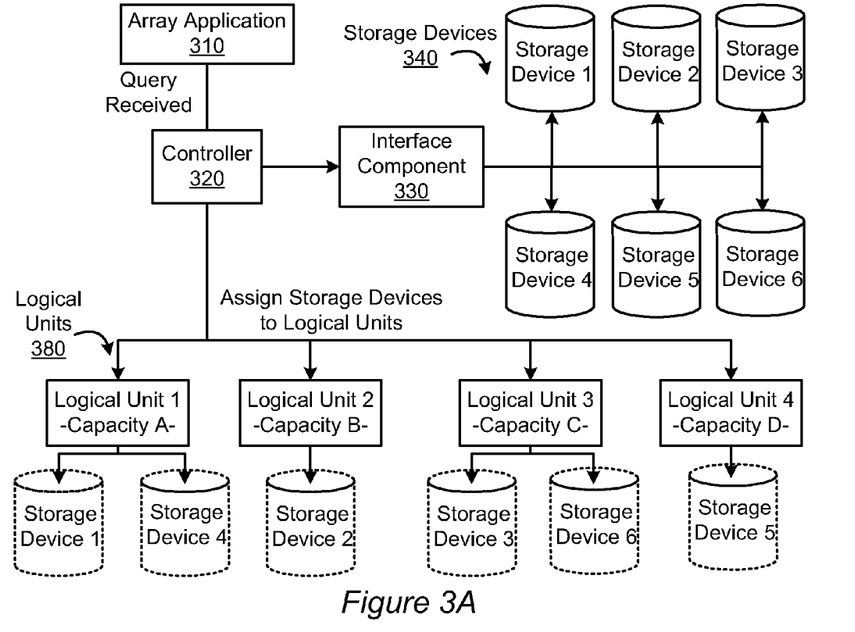
FIG. 3A illustrates a block diagram of an array application assigning storage devices to logical units according to an embodiment.

FIG. 3A illustrates a block diagram of an array application 310 assigning storage devices 340 to logical units 380 according to an embodiment. As noted above, a logical unit 380 can be a physical or virtual device created with storage from one or more storage devices 340 (Storage Device 1, Storage Device 2, Storage Device 3, Storage Device 4, Storage Device 5, and Storage Device 6). A logical unit 380 can have a predefined volume or storage capacity. The predefined storage capacity can be defined by the controller 320, the array application 310, a switch coupled to the device, and/or a storage client coupled to the switch.

As shown in FIG. 3, the controller 320 and/or the array application 310 determine that Logical Unit 1 has a predefined storage capacity of A, Logical Unit 2 has a predefined storage capacity of B, Logical Unit 3 has a predefined storage capacity of C, and Logical Unit 4 has a predefined storage capacity of D. The controller 320 and/or the array application 310 proceed to access the storage devices and determines that storage of Storage Device 1 and Storage Device 4 when combined form storage capacity A, Storage Device 2 has a storage capacity of B, Storage Device 3 and Storage Device 6 when combined form storage capacity C, and Storage Device 5 has a storage capacity D.

In response, as shown in the present embodiment, the controller 320 and/or the array application 310 proceed to allocate the storage capacity of Storage Device 1 and Storage Device 4 to Logical Unit 1, allocate the storage capacity of Storage Device 2 to Logical Unit 2, allocate the storage capacity of Storage Device 3 and Storage Device 6 to Logical Unit 3, and allocate the storage capacity of Storage Device to Logical Unit 4. The controller 320 and/or the array application 310 can additionally manage each of the logical units.

In another embodiment, the controller 320 and/or the array application 310 can additionally create logical unit controllers and/or logical unit applications for each logical unit. The logical unit controllers and/or applications can manage the logical units and the controller 320 and/or the array application 310 can route any communication from a switch or another device to the corresponding logical unit controller and/or application.

Figure 3B:
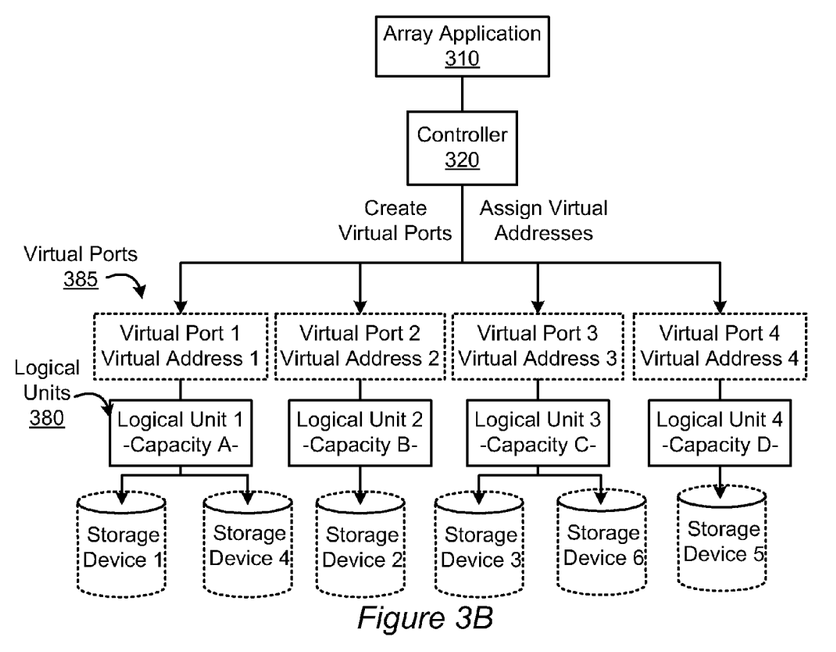
FIG. 3B illustrates a block diagram of an array application creating virtual ports for logical units and virtual addresses for the virtual ports according to an embodiment.

FIG. 3B illustrates a block diagram of an array application 310 creating virtual ports 385 for logical units 380 and virtual addresses for the virtual ports 385 according to an embodiment. A virtual port 385 can be a software emulation of a PHY (physical) port which is associated or designated for a logical unit 380. In one embodiment, the virtual port 385 can support the SAS protocol and mimics the functionality of a physical SAS port.

The controller 320 and/or the array application 310 can create a virtual port 385 by identifying an unused COM (communication) port of the device. The controller 320 and/or the array application 310 can then reserve the COM port as a virtual port 385. Any communication sent and/or received through the virtual port 380 can be routed through the reserved COM port to a corresponding logical unit 380. In another embodiment, the controller 320 and/or the array application 310 can use one or more virtualizers, hypervisors, and/or emulators to create a virtual port 385. In other embodiments, the controller 320 and/or the array application 310 can create a virtual port 385 using any additional method in addition to and/or in lieu of those noted above.

The controller 320 and/or the array application 310 can mimic signal processing and/or transmission for the virtual port 385. When mimicking the signal processing and/or transmission, the controller 320 and/or the array application 310 can manage send and/or receive functions for the virtual port 385. The array application 310 and/or the controller 320 create virtual ports 385 for each of the logical units 380 of the device. As shown in FIG. 3B, the controller 320 and/or the array application 310 create Virtual Port 1 for Logical Unit 1, Virtual Port 2 for Logical Unit 2, Virtual Port 3 for Logical Unit 3, and Virtual Port 4 for Logical Unit 4. By creating virtual ports 385 for the logical units 380, the controller 320 and/or the array application 310 can present the logical units 380 as physical SAS storage devices to be included in the SAS network.

Once the virtual ports 385 have been created for the logical units 380, the controller 320 and/or the array application 310 proceed to assign virtual addresses for each of the virtual ports 385. For the purposes of this application, a virtual address is an artificial address or unique identifier which is associated with a virtual port 385 of a logical unit 380. In one embodiment, the virtual address can be a virtual SAS address. In another embodiment, the virtual address can be an internet protocol address. One or more of the virtual addresses can be randomly generated by the controller 320 and/or the array application 310. In another embodiments, a user of the device, the controller 320, and/or the array application 310 can define one or more virtual addresses.

In one embodiment, the controller 320 and/or the array application 310 can additionally create a file, a list, and/or report which includes information of the logical units 380. The information can specify which virtual port 385 is associated with the corresponding logical unit 380. Additionally, the information can list the virtual address associated with the virtual port 385.

Figure 4A:
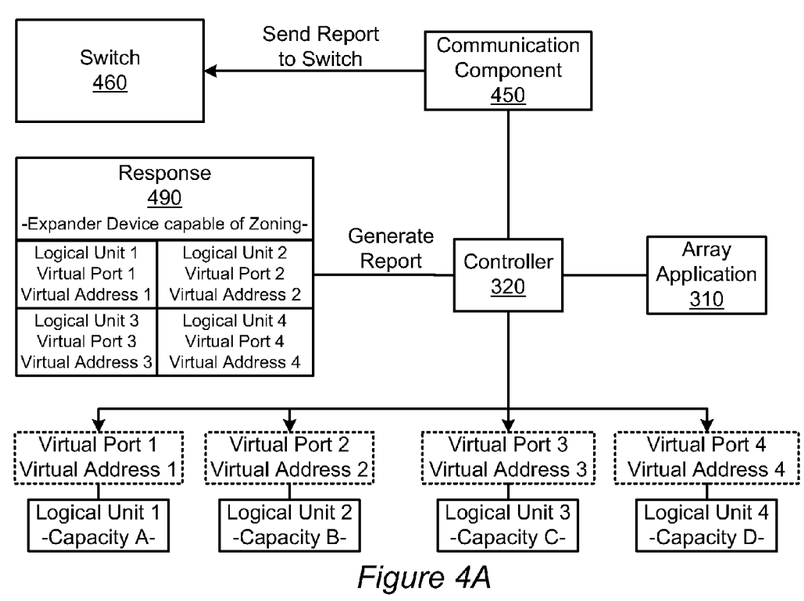
FIG. 4A illustrates a block diagram of an array application sending a response to a switch according to an embodiment.

FIG. 4A illustrates a block diagram of an array application 410 sending a response 490 to a switch 460 according to an embodiment. The response 490 can be generated by the controller 420 and/or the array application 410 as a file and/or message. Additionally, as shown in the present embodiment, the response 490 can list information of the device. In one embodiment, the response 490 can list each logical unit included on the device, each virtual port associated with each logical unit, and each virtual address assigned to each virtual port.

In another embodiment, the report 490 can additionally include a message indicating to the switch 460 that the device is an expander device capable of zoning. By presenting the device as an expander device capable of zoning, the switch 460 can attempt to discover the logical units of the device as SAS devices which can be included in the SAS fabric. Once the response 490 has been generated, the controller 420 and/or the array application 410 can instruct the communication component 450 to transmit the response 490 to the switch 460.

Figure 4B:
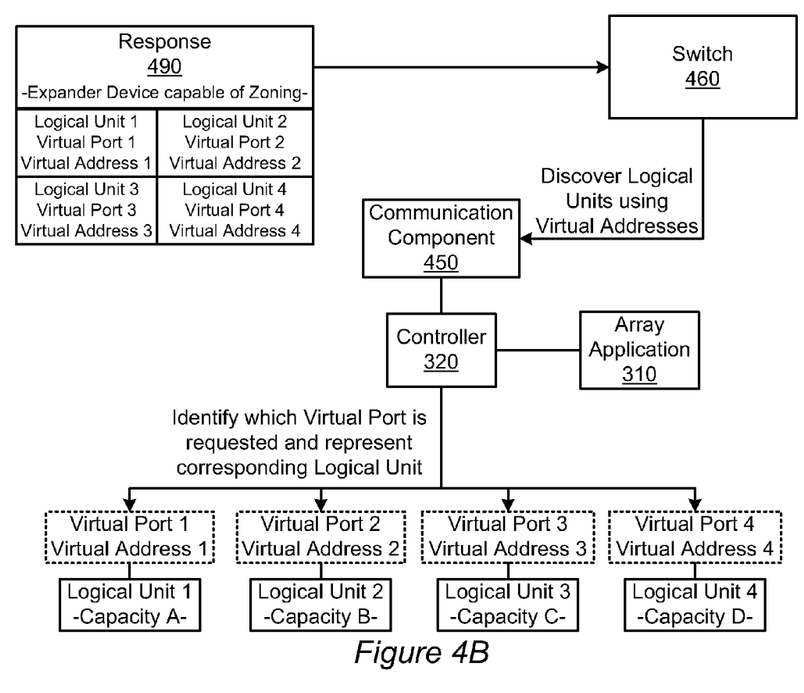
FIG. 4B illustrates a switch discovering logical units of a device in response to receiving a response from a device according to an embodiment.

FIG. 4B illustrates a switch 460 discovering logical units of a device in response to receiving a response 490 from the device according to an embodiment. In one embodiment, as shown in FIG. 4B, the response 490 specifies that the device 400 is an expander device capable of zoning. Because the device 400 is identified to support zoning, the switch 460 determines that the device 400 supports a SAS protocol.

In response to determining that the device is an expander device the, the switch 460 uses the information listed within the report 490 to determine that logical units are included on the device. As noted above, the report 490 lists that the device includes Logical Unit 1, Logical Unit 2, Logical Unit 3, and Logical Unit 4. Additionally, the report 490 lists Virtual Address 1 to be assigned to Virtual Port 1 of Logical Unit 1, Virtual Address 2 to be assigned to Virtual Port 2 of Logical Unit 2, Virtual Address 3 to be assigned to Virtual Port 3 of Logical Unit 3, and Virtual Address 4 to be assigned to Virtual Port 4 of Logical Unit 4.

Because the device was identified by the switch 460 to be an expander device, the switch 460 assumes that the virtual ports of the logical units are physical ports. Additionally, the switch 460 assumes that the virtual addresses are addresses to the physical ports of the logical units.

As a result, the switch 460 attempts to discover Logical Unit 1, Logical Unit 2, Logical Unit 3, and Logical Unit 4 through their corresponding virtual ports and virtual addresses. In one embodiment, when discovering the logical units, the switch 460 can send the communication component 450 of the device a discover query or request. The discover query or request can be sent as a filed, a message, and/or as signal.

In response to detecting the discover query or request from the switch 460, the controller 420 and/or the array application 410 proceed to determine which logical unit of the device the switch 460 is attempting to discover. In one embodiment, the switch 460 initially attempts to discover Logical Unit 1 with Virtual Address 1. The controller 420 and/or the array application 410 detect that Virtual Address 1 is being accessed and determine that Virtual Address 1 is assigned to Virtual Port 1 of Logical Unit 1.

In response, the controller 420 and/or the array application 410 mimic the functionality of the physical (PHY) port. As noted above, when mimicking the signal processing and/or transmission, the controller 420 and/or the array application 410 can manage sending and/or receiving functions, instructions, and/or data for the virtual port associated with the Virtual Address.

In one embodiment, the controller 420 and/or the array application 410 can determine which of the virtual addresses the switch 460 is using for discover. The controller 420 and/or the array application 410 can then identify a corresponding Virtual Port associated with the virtual address. A logical unit associated with the virtual port can then be identified and the controller 420 and/or the array application 410 can report to the switch 460 information of the logical unit.

In another embodiment, the controller 420 and/or the array application 410 route the discovery query through Virtual Port 1 over to Logical Unit 1. Routing the discovery query includes the controller 420 and/or the array application 410 routing the discovery query though a COM port previously reserved for Virtual Port 1. In response to receiving the discovery query, Logical Unit 1 provides a response that it includes a storage Capacity of A. The controller 420 and/or the array application 410 can additionally route this information back through Virtual Port 1 and then instruct the communication component 450 to send a response of this information from Logical Unit 1 to the switch 460.

The controller 420 and/or the array application 410 can repeat one or more of the methods noted above for each logical unit of the device the switch 460 attempts to discover. Additionally, the switch 460 can discover each of the logical units of the device sequentially and/or in parallel.

Figure 5:
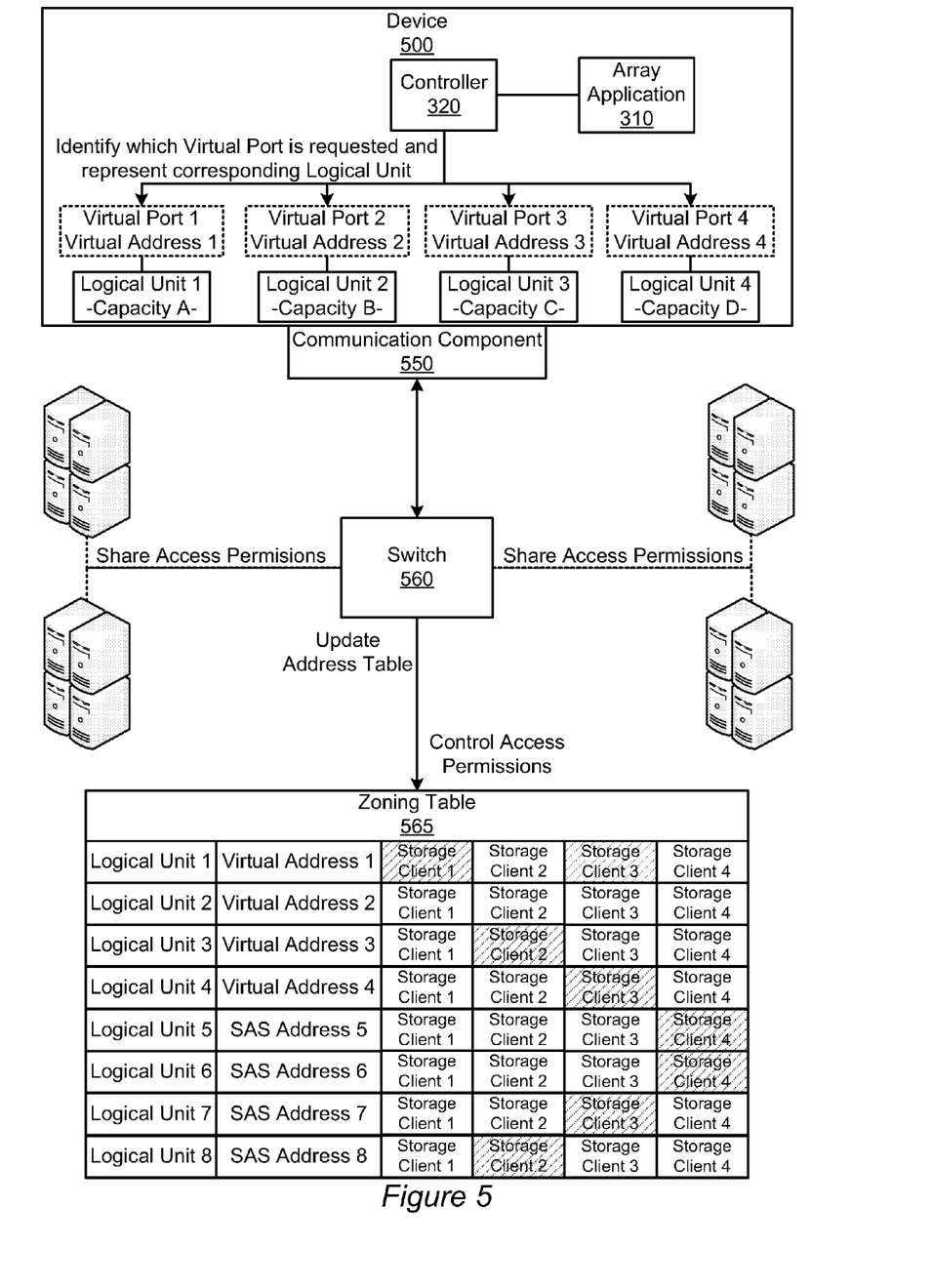
FIG. 5 illustrates a switch updating a zoning table and controlling access permission in response to discovering logical units of a device according to an embodiment.

FIG. 5 illustrates a switch 560 updating a zoning table 565 and controlling access permissions in response to discovering logical units of a device 500 according to an embodiment. The zoning table 565 can be a file, list, and/or database which includes information of the network. In one embodiment, the zoning table 565 includes information of the SAS network.

As shown in FIG. 5, in one embodiment, the zoning table 565 includes a list of logical units detected within the SAS network. In one embodiment, the switch 560 has already detected Logical Unit 5, Logical Unit 6, Logical Unit 7, and Logical Unit 8 to be on other devices within the SAS network. Additionally, the zoning table 565 lists addresses for ports corresponding to the logical units and lists access permissions to the logical units within the SAS network. Further, the address table 565 lists each device included in the SAS network, Storage Client 1, Storage Client 2, Storage Client 3, and Storage Client 4.

As noted above, the switch 560 has successfully discovered Logical Unit 1, Logical Unit 2, Logical Unit 3, and Logical Unit 4 on the device 500 through their corresponding virtual ports and virtual addresses. In response, the switch 560 proceeds to update or modify the zoning table 565 to include the information of the logical units from the device 500. As shown in the present embodiment, the switch 560 updates the zoning table 565 to list Logical Unit 1, Logical Unit 2, Logical Unit 3, and Logical Unit 4 from the device 500. Further, the switch 560 updates the zoning table 565 to list the Virtual Addresses for each of the logical units from the device 500.

Once the zoning table 565 has been updated to include the logical units from the device 500, the switch 560 can control or manage access permissions to the logical units by marking the zoning table 565 to mask or block access to one or more logical unit by one or more devices within the network. By masking or blocking access, a PHY (physical) port of a corresponding logical unit cannot be accessed by a device which has been marked to block.

As shown in FIG. 5, the zoning table 565 lists that Storage Client 1 can access each of the logical units except Logical Unit 1. Additionally, Storage Client 2 cannot access Logical Unit 3 and Logical Unit 8. Further, Storage Client 3 cannot access Logical Unit 1, Logical Unit 4, and Logical Unit 7. In addition, Storage Client 4 cannot access Logical Unit 5 and Logical Unit 6. The switch 560 can share the address table 565 with access permissions with other devices coupled to the switch 560. Using the address table 565, the other devices, such as storage clients, can know which logical units within the network they can access through corresponding addresses of the logical units.

Figure 6:
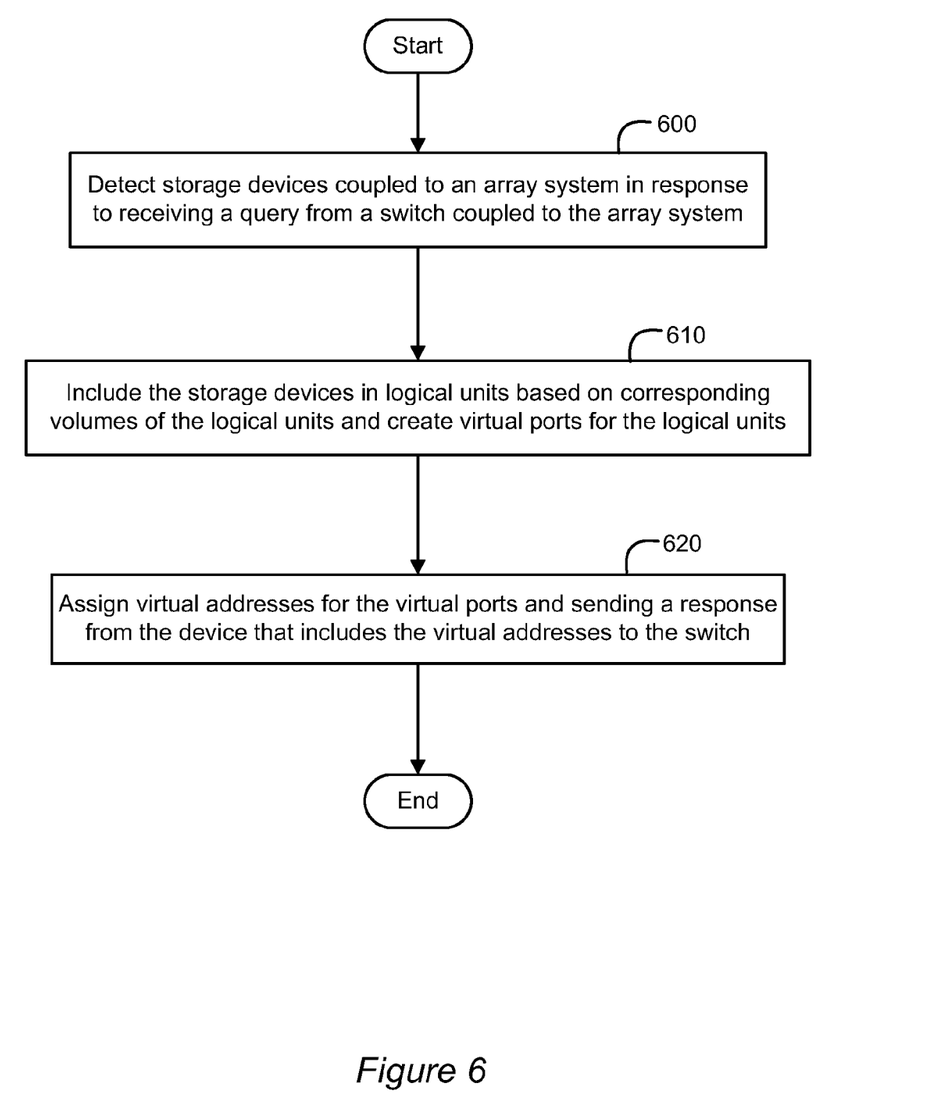
FIG. 6 is a flow chart illustrating a method for communicating with a switch according to an embodiment.

FIG. 6 is a flow chart illustrating a method for communicating with a switch according to an embodiment. The method of FIG. 6 uses a portable device with a controller, a communication component, an interface component, at least one storage device, a logical unit, a communication channel, and/or an array application. In other embodiments, the method of FIG. 6 uses additional components and/or devices in addition to and/or in lieu of those noted above and illustrated in FIGS. 1, 2, 3, 4, and 5.

As noted above, the device can be coupled to a switch through a communication component and receive a query from the switch. In response to detecting the query from the communication component, the controller and/or the array application can proceed to detect any storage devices coupled to an interface component of the device 600. Additionally, the controller and/or the array application can assign the storage devices to one or more logical units of the device.

As noted above, the storage devices are assigned to the logical units based on corresponding volumes of the logical units. Once the storage devices have been assigned to the logical units, the controller and/or the array application can create virtual ports for the logical units 610. As noted above, the controller and/or the array application mimic the functionality of physical (PHY) ports with the virtual ports by mimicking signal processing and/or transmission for the virtual port. In one embodiment, the controller and/or the array application additionally reserve an unused COM port of the device and assign the unused COM port to the virtual port.

The controller and/or the array application can create virtual ports for each of the logical units. Once the virtual ports have been created, the controller and/or the array application can assign each of the virtual ports a virtual address and send a response with the virtual addresses to the switch 620. As noted above, the virtual address can be a SAS address generated by the controller, the array application, and/or a user of the device. Additionally, the report can be a file, a signal, and/or message which includes the virtual address of each of the virtual ports of the device.

Using the addresses from the report, the switch can attempt to discover the logical units on the device. The switch can assume that the virtual addresses are real address associated with physical ports. As a result, the switch attempts to discover the logical units to include as part of the network. The switch can additionally control access permission for the logical units of the device.

The switch can implement a zoning feature within the network by updating a zoning table to include the addresses of the logical units. Additionally, the switch can mark the zoning table to not allow devices, such as storage clients, coupled to the switch from accessing one or more of the logical units. The method is then complete. In other embodiments, the method of FIG. 6 includes additional steps in addition to and/or in lieu of those depicted in FIG. 6.

Figure 7:
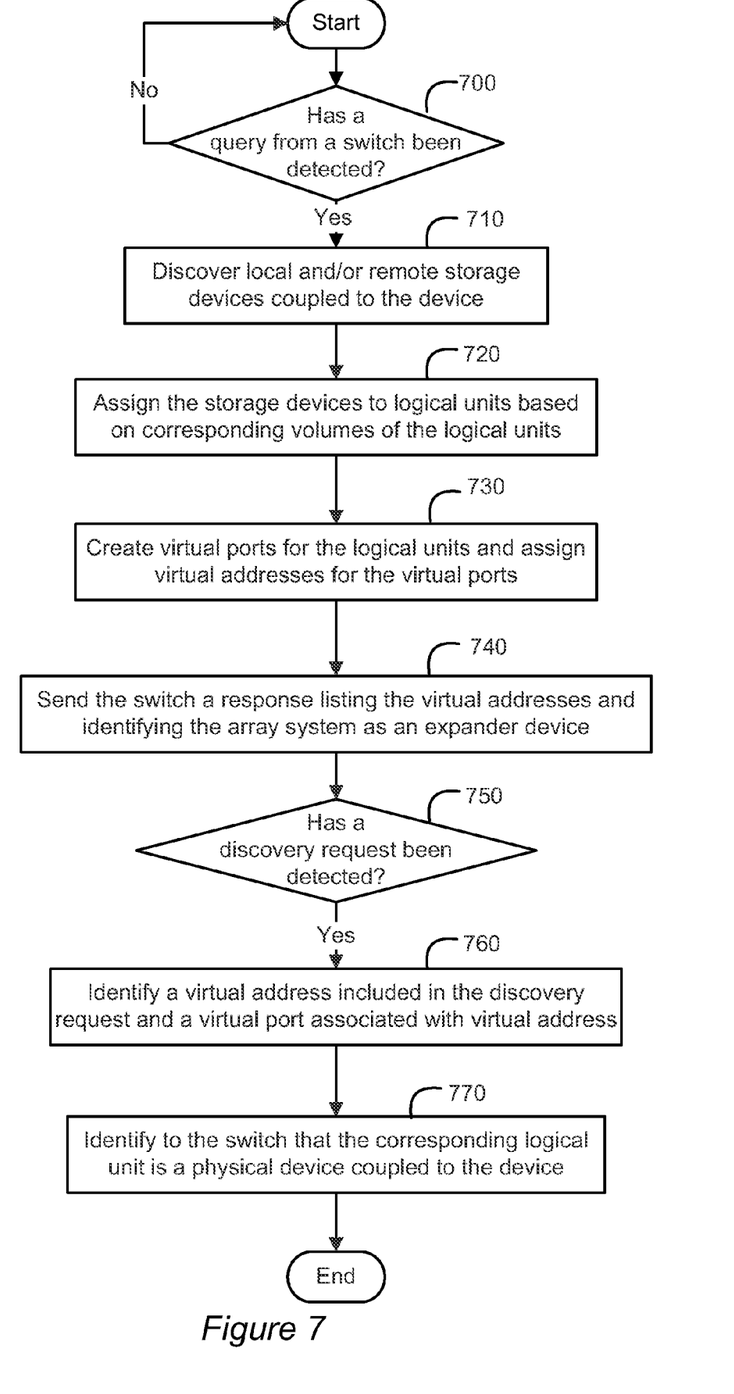
FIG. 7 is a flow chart illustrating a method for communicating with a switch according to another embodiment.

FIG. 7 is a flow chart illustrating a method for communicating with a switch according to another embodiment. Similar to the method above, the method of FIG. 7 uses a portable device with a controller, a communication component, an interface component, at least one storage device, a logical unit, a communication channel, and/or an array application. In other embodiments, the method of FIG. 7 uses additional components and/or devices in addition to and/or in lieu of those noted above and illustrated in FIGS. 1, 2, 3, 4, and 5.

As noted above, the device can be an array system. The controller and/or the array application of the array system can initially use the communication component to detect whether a query has been received from a switch 700. If not query has been detected, the controller and/or the array application can continue to detect for the query 700. If a query has been detected. The controller and/or the array application can detect storage devices coupled to the device through an interface component of the device 710.

Once all of the storage devices have been detected, the controller and/or the array application can proceed to assign the storage devices to logical units based on corresponding volumes of the logical units 720. A number of logical units for the device and/or a capacity of the logical units can be predefined by the controller, and/or the array application. In response to the storage devices being assigned to the logical units, the controller and/or the array application can proceed to create virtual ports for the logical units and assign virtual addresses for each virtual port 730.

As noted above, the virtual ports are software emulations of physical (PHY) ports. When creating the virtual ports, the controller and/or the array application can mimic the functionality of a physical (PHY) port for sending and/or receiving information. Additionally, the controller and/or the array application can generate virtual addresses and assign them to each virtual port. As noted above, the virtual addresses can be SAS addresses.

The controller and/or the array application can then include the virtual addresses of the virtual ports in a report to transmit to the switch. As noted above, the switch can use the report to collect information of the device, such as number of logical units and/or an address of ports associated with the logical units. Additionally, the switch can use the information in the report to discover the logical units on the device. In one embodiment, when discovering the logical units, the switch can send a discovery query or request.

If the controller and/or the array application detect the discovery query or request, the controller and/or the array application can detect which virtual address the switch is using to discover a logical unit. Based on the virtual address, the controller and/or the array application can identify a virtual port associated with the virtual address 760. The controller and/or the array application can then identify the corresponding logical unit the switch is attempting to discover.

Once the logical unit to be discovered has been identified, the controller and/or the array application can mimic the functionality of the logical unit and provide a response through the virtual port back to the switch. In one embodiment, the controller and/or the array application identify to the switch that the logical unit is a physical device coupled to the device 770.

In another embodiment, the logical unit can include a logical unit controller and/or logical unit application which can communicate with the controller and/or array application. The controller and/or the array application can route any communication from the switch over to the logical unit controller and/or logical unit application. Additionally, the controller and/or the array application can route any communication from the logical unit controller and/or the logical unit application back to the switch.

Once the logical units have been discovered by the switch, the switch can edit or update a zoning table to include the logical units of the device. Additionally, the switch can control access permission to the logical units through zoning. The switch can mark on the zoning table, devices which cannot access the virtual ports of the logical units, and share the zoning table with other devices coupled to the switch. The method is then complete. In other embodiments, the method of FIG. 7 includes additional steps in addition to and/or in lieu of those depicted in FIG. 7.

What is claimed is:

1. A method for communicating with a switch, the method comprising:
    detecting storage devices coupled to a device in response to receiving a query from the switch coupled to the device;
    assigning the detected storage devices to logical units based on corresponding volumes of the logical units and creating a respective virtual port for each of the logical units, wherein a particular one of the logical units includes a plurality of the storage devices;
    assigning virtual addresses to the corresponding virtual ports and sending, from the device to the switch, a message that includes the virtual addresses assigned to the corresponding virtual ports;
    receiving a discovery request from the switch;
    identifying a corresponding logical unit to be discovered based on an address of the discovery request; and
    identifying to the switch that the corresponding logical unit is a physical device coupled to the device.

2. The method of claim 1 wherein the message from the device identifies that the device is an expander device capable of zoning.

3. The method of claim 1 wherein identifying the corresponding logical unit includes identifying which virtual port the address of the discovery request is associated with and which corresponding logical unit is associated with the identified virtual port.

4. The method of claim 1 wherein the switch updates an address table with the virtual addresses of the virtual ports.

5. The method of claim 1 wherein the switch uses the virtual addresses of the virtual ports to control access permissions of the logical units of the device.

6. The method of claim 5 wherein the switch shares the access permissions with other devices coupled to the switch and the other devices can use the access permissions to identify which logical units of the device can be accessed.

7. The method of claim 1, wherein the virtual ports provide software emulations of physical ports.

8. A device configured to communicate with a switch and to couple to storage devices, the device comprising:
    a controller; and
    instructions executable on the controller to:
        assign the storage devices to logical units;
        create a respective virtual port for each of the logical units in response to receiving a query from the switch, wherein the virtual ports provide software emulations of physical ports, and wherein a particular one of the logical units includes a plurality of the storage devices;
        create virtual addresses for the corresponding virtual ports;
        send a response with the virtual addresses to the switch;
        receive a discovery request from the switch;
        identify a corresponding logical unit to be discovered based on an address of the discovery request; and
        identify to the switch that the corresponding logical unit is a physical device coupled to the device.

9. The device of claim 8 wherein the device is an array system.

10. The device of claim 8 wherein the switch is a serial attached SCSI (small computer system interface) switch.

11. The device of claim 8 further comprising an interface component to couple to the storage devices, wherein the interface component includes at least one of a small computer system interface port, an serial advanced technology attachment port, an external serial advanced technology attachment port, a peripheral component interconnect port, a peripheral component interconnect express port, an integrated drive electronics port, universal serial bus port, a serial device port, a compact flash port, and an extreme digital port.

12. The device of claim 8 further comprising a network interface component to couple to the storage devices.

13. The device of claim 12 wherein at least one of the storage devices is remotely coupled to the device through the network interface component.

14. The device of claim 8, wherein the virtual ports provide software emulations of physical ports.

15. A non-transitory computer readable medium comprising instructions which, when executed by a processor, cause the processor to:

discover storage devices coupled to a device in response to detecting a query from a switch coupled to the device;

assign the discovered storage devices to logical units of the device based on corresponding volumes of the logical units and create a respective virtual port for each of the logical units, wherein a particular one of the logical units includes a plurality of the storage devices;

assign virtual addresses to the corresponding virtual ports and send, to the switch, a report listing the virtual addresses assigned to the corresponding virtual ports;

receive a discovery request from the switch;

identify a corresponding logical unit to be discovered based on an address of the discovery request; and identify to the switch that the corresponding logical unit is a physical device coupled to the device.

16. The computer readable medium of claim 15 wherein the switch accesses the virtual ports with the virtual addresses.

17. The computer readable medium of claim 15 wherein the switch discovers the logical units of the device as serial attached Small Computer System Interface (SCSI) devices through the virtual ports.

18. The computer readable medium of claim 15, wherein the virtual ports provide software emulations of physical ports.

\* \* \* \* \*